March 15, 1932.  R. B. CLARK  1,849,364
ADJUSTABLE HOOK
Filed March 1, 1930
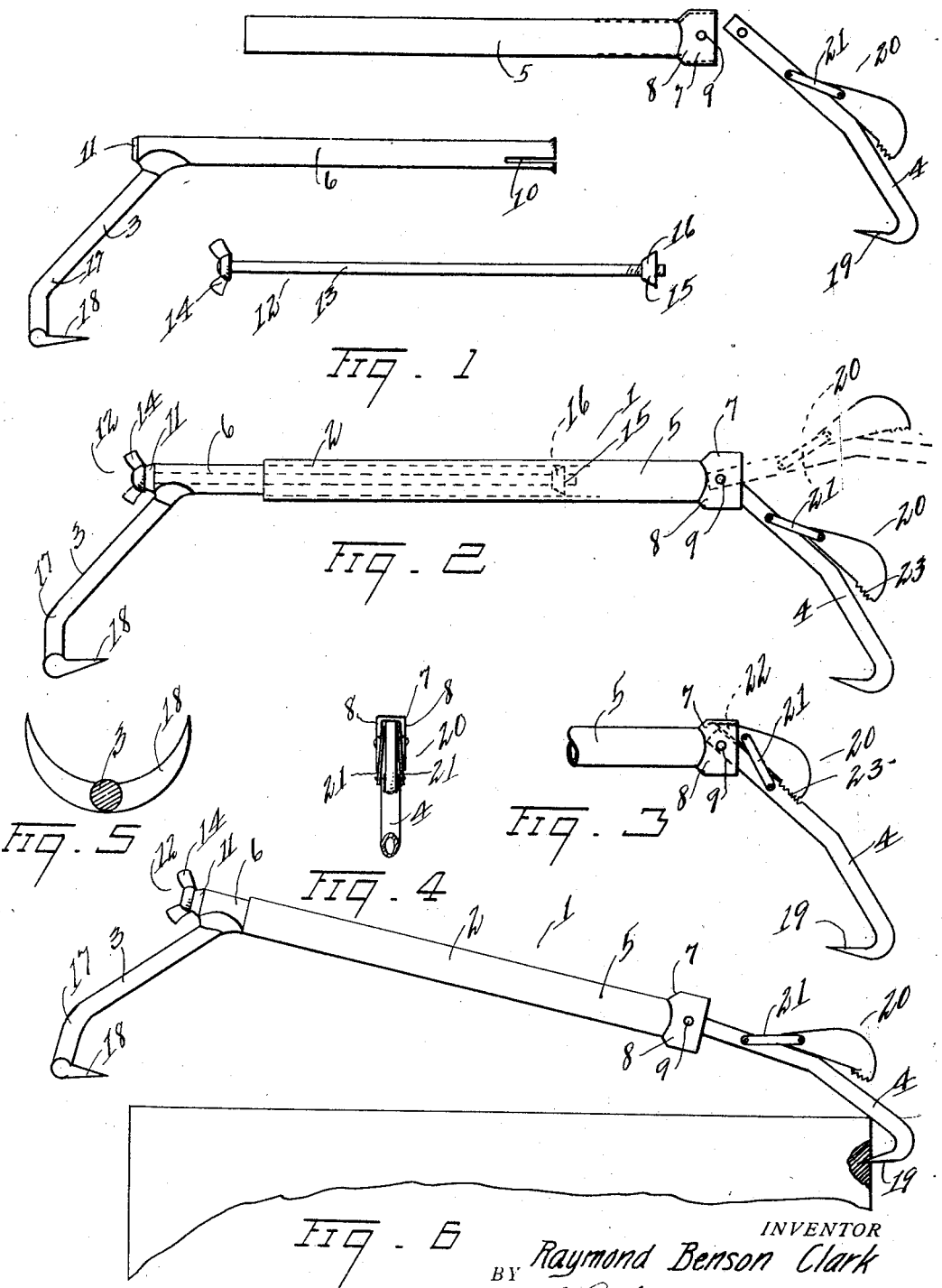
INVENTOR
Raymond Benson Clark
BY E. E. Sauyi  ATTORNEY Patented Mar. 15, 1932

1,849,364

UNITED STATES PATENT OFFICE

RAYMOND BENSON CLARK, OF PORTLAND, OREGON

ADJUSTABLE HOOK

Application filed March 1, 1930. Serial No. 432,516.

This invention relates to adjustable hooks, and has as one of its objects to provide a hook that is adapted to provide a simple and effective means for handling wooden boxes of various sizes.

Another object of the invention is to provide an adjustable hook that will fasten securely to the box by means of hooks.

A further object of the invention is to provide an adjustable hook that may be secured to the box with ease of manipulation.

A further object of the invention is to provide an adjustable hook, having a locking means, that will maintain the hook in engagement with the box, and will not become released when the carrying hand is removed therefrom.

A further object of the invention is to provide an adjustable hook that will maintain the relative positions of the hook and box without rocking.

A further object of the invention is to provide an adjustable hook that has an adjusting feature enclosed within the handle, whereby there is nothing to catch on branches or other interfering objects.

With these and other objects in view reference is now had to the accompanying drawings in which Fig. 1 shows the device disassembled exhibiting the various parts thereof;

Fig. 2 shows the assembled device in side elevation;

Fig. 3 is a fragment of the device showing the locking means in the engaging position;

Fig. 4 is an end view thereof;

Fig. 5 is a plan view of the bifurcated claw; and

Fig. 6 shows the application of the device as about to be secured to a box.

Having reference to the drawings like numerals refer to like parts throughout the several views and numeral 1 refers to the device as a whole consisting of certain essential parts to be specifically mentioned as follows:

Primarily the device consists of an adjustable handle 2, a stationary hook 3, and a movable hook 4, which will now be described. The handle 2 comprises a pair of members, preferably tubular in form and adapted to telescope one within the other.

For this purpose the handle consists of an outer tube 5 and an inner tube 6, with the outer tube being provided with a flattened end 7 adapted to form a parallelogram in cross section to provide two flattened and oppositely positioned sides 8 providing a guide for the movable hook 4, with its oppositely positioned top and bottom portions providing a stop to limit the movement of said hook in a vertical plane about a hinge 9.

The inner tube 6 being designed to be expanded within the outer tube is slotted at one end, as at 10, and is decreased in diameter at the opposite and outer end 11 to form a bearing for an adjusting means 12 which consists of a rod 13, threaded at one end, and provided on its outer end with a thumb nut 14 or similar means, whereby the rod may be rotated to advance or retract a wedge member 15 threadedly engaged with the threaded end of said rod, with its face 16 engaging the slotted end of said inner tube, whereby when the said thumb nut is turned the wedge member will expand the inner end of said inner tube and force it into contact with the inner wall of the outer tube, in the usual manner of such operations, thus frictionally securing the inner and outer tubes together for predetermined adjustment as to length.

This also provides for the adjusting means 12 to be concealed within the tubes to thus form a smooth and continuous handle 2 having no extended members adapted to catch on branches or other interfering objects.

The hook 3 is rigidly secured to the exposed end 11 of the inner tube in any suitable manner and depends therefrom to provide a gripping member, and is offset, as at 17, as shown, to extend beyond the handle which obviates the necessity of a handle of undue length.

This hook 3 being rigid with respect to the handle is obviously under positive control by the manipulation of said handle, and this hook therefore is equipped on its lower end with a bifurcated claw 18, as shown in plan enlarged in Fig. 5, and this claw, by being successfully manipulated, with both its points engaging the load to be carried, will obviously prevent rotation of the handle, secured to said hook, in a manner and for a purpose to be explained.

The second hook, above mentioned as a movable hook, is hingedly attached to the outer tube by the hinge 9, and in the above mentioned flattened portion, and in operable conjunction with this flattened portion as a guide with the top and bottom portions as a top, whereby to limit its range of movement in a vertical plane.

This movable hook 4 is equipped with a single claw 19 whereby securement to the load may be accomplished semi-automatically and without close observation by the operator, by which means the adjustable hook may be readily attached to the load.

It is a recognized fact that at times it is desirable to relinquish hold upon the adjustable hook to attend to other temporary duties and for this purpose a lock 20 is provided which is adapted to secure the movable hook against upward movement in its plane, and this lock consists of a member U or other appropriate shape in cross section for linked association with the last named movable hook, and is secured thereon by means of a link 21 preferably pivotally attached to the said movable hook and to said lock.

The lock consists of a dog having provided at its upper end a wedge shaped nose 22 disposed to engage the unoccupied portion of the flattened end 7 of the outer tube 5, and by its wedge shape, and by teeth formed in the dog and the shank of the hook as shown, to maintain the movable hook in a rigid position in its plane, and rigidly with respect to the first named hook and in securement with said load.

By this means and with the bifurcated claw the handle may be relinquished without danger of the adjustable hook changing its position with respect to the load or dropping therefrom. The dog will prevent any outward movement of the hooks from their original position of securement and the bifurcated claw will prevent a side movement of the handle even with the movable hook secure with only a single point or claw.

In use the dog is forced outward under the yoke to the position in Fig. 6 which permits the movable hook to swing free.

In attaching the hook to the load the free swinging hook is dropped over the top edge of the box and by a continuous movement the point is engaged, as shown in this figure, the point being guided to its proper position of engagement as and by the arm of this hook as it comes in contact with the top of the box.

The handle is now continued downward still retaining a slight tension on the movable hook and moving the handle on the hinge, until the bifurcated claw is opposite the first mentioned point when by giving the handle a slight twist in a vertical plane the handle will be brought to a horizontal position, as shown in Fig. 2. The claw will now engage the load with absolute security, and more particularly as when the handle is raised bringing the load into firmer contact with the points of the respective hooks.

It is now evident that the movable hook will have a declination approximating that of the rigidly secured hook, hence a space is left above the movable hook in the flattened guide of the outer tube and therefore with this space provided and with the dog forced thereinto, to the position shown in Fig. 3, the movable hook cannot straighten out when the handle is relinquished; the handle consequently cannot drop down nor will the bifurcated claw permit the device to drop sideways; hence this handle becomes a unit stationary with the load if desired.

Having thus described my invention, I claim:

1. In an adjustable hook, the combination of a handle provided with oppositely disposed hooks, one of said hooks being movable with respect to said handle, and means to optionally secure said hook rigidly in the handle.

2. In an adjustable hook, an adjustable handle, having an adjustable means contained therein, and provided with oppositely disposed hooks, one of said hooks being hingedly attached to said handle, and a locking means associated with said hook and handle, and adapted to secure said hook rigidly in the handle.

3. In an adjustable hook, a handle comprising a pair of telescoping members consisting of an outer tube and an inner tube means to swell said inner tube for frictional securement within the outer tube, in a predetermined and concealed position, a hook rigidly secured to the exposed end of said inner tube and depending to form a gripping member, a second depending hook hingedly attached to said outer tube in a manner to limit its range of movement in a vertical plane, and a lock associated with said last named hook and disposed to engage said outer tube to lock said hook rigidly with respect to the first named hook.

4. In an adjustable hook, a handle, comprising a pair of telescoping members, consisting of an outer tube and an inner tube, said outer tube being flattened at one end in a manner to provide a hinge, a guide, and a stop, means to swell said inner tube for frictional securement within said outer tube, in a concealed position, and for predetermined adjustment, a hook rigidly secured to the exposed end of said inner tube, and depending to form a gripping member, and provided on its lower end with a bifurcated claw adapted to prevent rotation of said gripping member with the load to be carried, a second hook hingedly attached to said outer tube in operable conjunction with said guide and stop, in a manner to limit its range of movement in a vertical plane, and a dog mounted on said last named hook, and provided with a wedge shaped nose disposed to engage said stop to lock said hook in securement with said load.

In testimony whereof I affix my signature.

RAYMOND BENSON CLARK.